(12) United States Patent
Horneff

(10) Patent No.: US 9,824,669 B2
(45) Date of Patent: Nov. 21, 2017

(54) CLIMATE CONTROLLED GUITAR CABINET

(71) Applicant: American Music Furniture Co., LLC, Perkasie, PA (US)

(72) Inventor: Roger Horneff, Doylestown, PA (US)

(73) Assignee: American Music Furniture Co., LLC, Perkasie, PA (US)

( * ) Notice: Subject to any disclaimer, the term of this patent is extended or adjusted under 35 U.S.C. 154(b) by 0 days.

(21) Appl. No.: 15/224,885

(22) Filed: Aug. 1, 2016

(65) Prior Publication Data
US 2017/0032774 A1    Feb. 2, 2017

Related U.S. Application Data

(60) Provisional application No. 62/199,765, filed on Jul. 31, 2015.

(51) Int. Cl.
| | | |
|---|---|---|
| G10G 5/00 | (2006.01) |
| A47B 81/00 | (2006.01) |
| A47B 55/00 | (2006.01) |
| A47B 96/00 | (2006.01) |
| A47B 96/02 | (2006.01) |
| A47F 3/00 | (2006.01) |

(Continued)

(52) U.S. Cl.
CPC ............. *G10G 5/00* (2013.01); *A47B 55/00* (2013.01); *A47B 81/00* (2013.01); *A47B 96/00* (2013.01); *A47B 96/021* (2013.01); *A47F 3/001* (2013.01); *B01D 53/268* (2013.01); *B01D 53/32* (2013.01); *B01D 2257/80* (2013.01); *B01D 2258/06* (2013.01); *B01D 2259/80* (2013.01)

(58) Field of Classification Search
CPC ....... A47B 96/021; A47B 81/00; A47B 96/00; A47F 3/001; B01D 53/32
See application file for complete search history.

(56) References Cited

U.S. PATENT DOCUMENTS

| | | | |
|---|---|---|---|
| 2,977,171 A | 3/1961 | Gleason |
| 3,023,064 A | 2/1962 | Sosa |
| 5,400,612 A | 3/1995 | Hedges |

(Continued)

FOREIGN PATENT DOCUMENTS

| | | |
|---|---|---|
| CN | 101787840 A | 7/2010 |
| CN | 201818204 U | 5/2011 |
| CN | 202227907 U | 5/2012 |

OTHER PUBLICATIONS

Mitsubishi Electric Corp., The protective apparatus against dew condensation, Electrolysis type Dehumidifying element / Dehumidifier ROSAHL, Sep. 2007, entire document, Amagasaki-City, Hyogo Prefecture, Japan.

*Primary Examiner* — Kimberly Lockett
(74) *Attorney, Agent, or Firm* — Spruce Law Group, LLC

(57) ABSTRACT

A wooden guitar cabinet features a door equipped with one or more interior channels that allow the interior of the door to be in contact with the air in the interior of the cabinet, thereby keeping the interior of the door at the same level of humidity as the interior of the cabinet. This allows for the interior of the cabinet to be maintained at the optimal humidity levels for storing guitars while minimizing the risk of unsightly warping in the cabinet doors. The cabinet may be optionally equipped with a locking mechanism to prevent guitars from falling off shelves in the case of movement.

11 Claims, 4 Drawing Sheets

(51) Int. Cl.
B01D 53/32 (2006.01)
B01D 53/26 (2006.01)

(56) References Cited

U.S. PATENT DOCUMENTS

| | | | |
|---|---|---|---|
| 5,651,262 | A | 7/1997 | Pendergast |
| 5,829,451 | A | 11/1998 | Barber |
| 5,970,987 | A | 10/1999 | Barreiro |
| 6,027,187 | A | 2/2000 | Siepmann |
| 6,047,701 | A | 4/2000 | Feldman |
| 6,615,841 | B2 | 9/2003 | DeLoach |
| 2005/0073224 | A1* | 4/2005 | Livingston ......... A47B 47/0091 312/265.6 |
| 2007/0023940 | A1 | 2/2007 | Siess |

* cited by examiner

CLIMATE CONTROLLED GUITAR CABINET

BACKGROUND

Guitars can last a long time when properly maintained. And with collectible guitar prices extending into the millions of dollars, properly caring for a guitar is a priority for many people. Even the cheapest guitar can hold tremendous value to a musician because it may have been the first instrument they ever owned, because there may be a special story behind it, or other such sentimental reasons.

One important way to care for a guitar is to store it at a proper humidity, usually between 45-55%. This is typically accomplished by means of sealed, airtight cases, as well as portable guitar case humidifiers. The failure of these methods is that they fail to present the guitar in a fashion that is aesthetically pleasing; often the guitar is concealed from view (such as in portable guitar cases), and the exterior of the case is frequently sterile and unattractive. Traditional wood cabinets with glass doors provide a more attractive option for displaying the guitars, and sometimes come equipped with humidifiers. However, such cabinets often suffer from warping, because the interior humidity differs from the exterior humidity; this results in damage as the wood is forced to contract and expand.

Thus, there is a need for an attractive guitar cabinet that stores, protects, and attractively displays the guitars, while simultaneously controlling the humidity inside the cabinet.

SUMMARY

A cabinet has an enclosed storage area for storing items; and doors for accessing the storage area, wherein such doors have one or more internal channels there through, wherein the channels are in communication with the interior of storage area through channel vents, and wherein the aforementioned channels allow for air inside the storage area to be in contact with an interior of the door.

DETAILED DESCRIPTION OF THE EMBODIMENTS

Warping Reduction Channel

Figure 1:
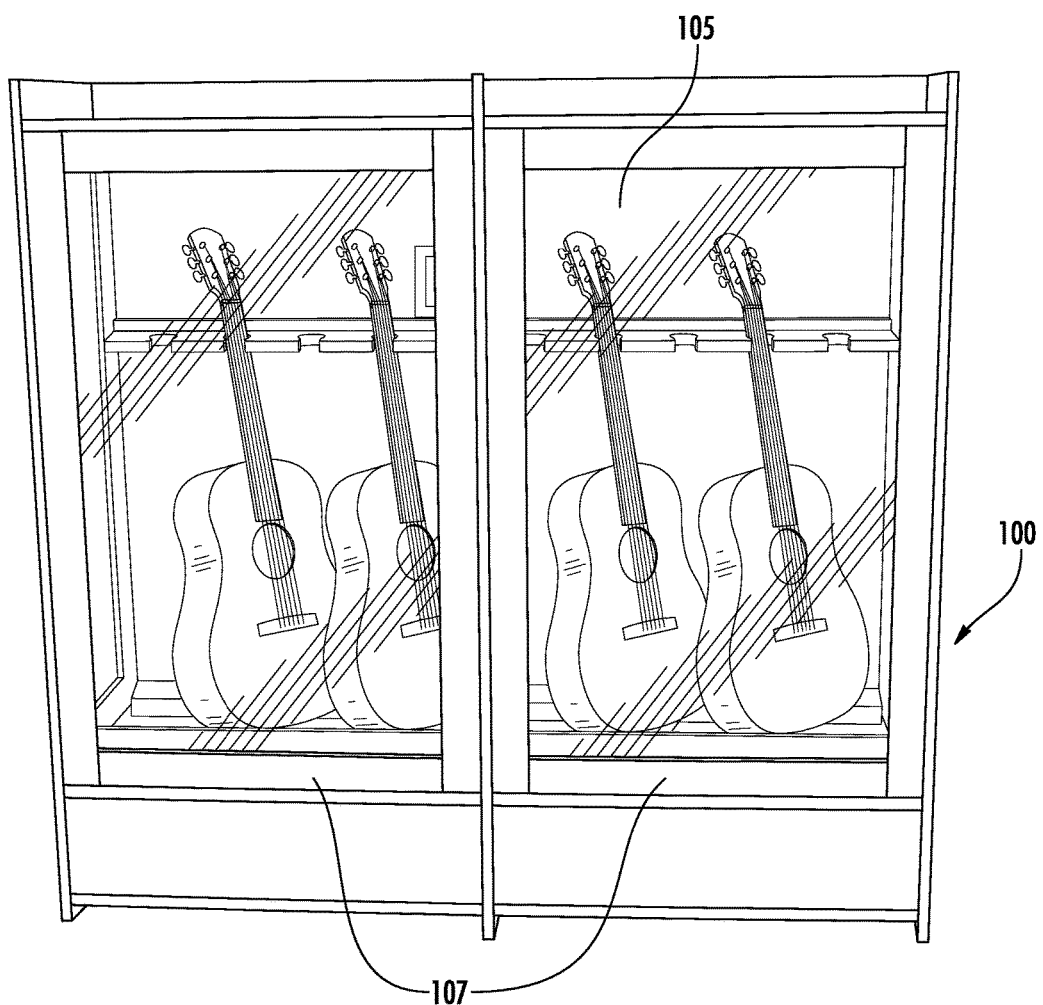
FIG. 1 shows the guitar cabinet.
Figure 2:
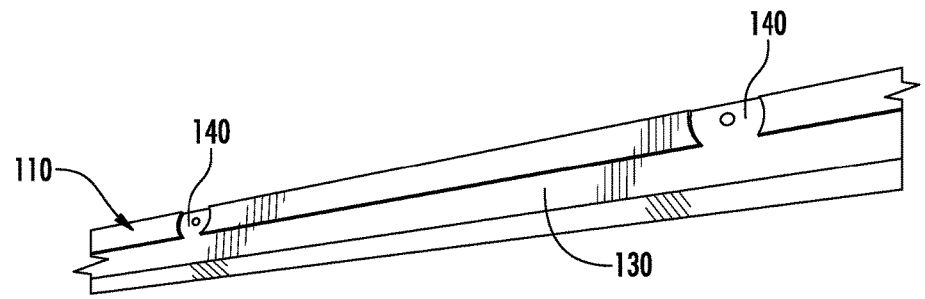
FIGS. 2-5 show assembly features of the guitar cabinet door-frame.

When a humidor or humidified cabinet is used in a room with a low humidity level, the door frames can easily warp, since the inside of a humidor or humidified cabinet is at a much higher humidity level than the air in the room around the cabinet. The warping is caused by the wood on the humidified side of the door expanding from the humidity inside the humidor or humidified cabinet, while the wood on the outside of the door shrinks from the low ambient humidity in the room around the cabinet.

The traditional technique to reduce the likelihood of warping is to make each piece of the door-frame out of three strips of wood, with the middle strip turned so that its grain is going a different direction than the outer strips. This technique may be better than using one solid piece of wood for each piece of the door frame, but it is not adequate to fight the humidity difference between the inside and the outside of the cabinet.

One solution to prevent warping is to keep the door-frame at one consistent humidity level. By eliminating the drastic difference in humidity within the door-frame, the door may not be forced into a warp by the expansion and contraction of the wood in the door frame.

With reference to FIGS. 1-5, the cabinet 100 comprises a holding area 105 for holding guitars (and other moisture sensitive instruments), and doors 107 for accessing the guitars. The doors 107 may use the traditional method of a three-piece door-frame with the middle piece 110 turned to run the grain a different direction than the outer pieces 120. Channels 130 down the length of the middle strip 110 allow air to enter into the inside of the door-frame through vent channels 140. The door-frames are thus vented so that the humid air in the cabinet 100 can enter the routed channels 130 and saturate the door-frame with the humidity level inside the cabinet 100.

During production, the channel 130 is routed down the length of the middle strip 110 of wood that will be glued between the two outer strips 120 to make the sides of the door-frame. The small circular cuts at the edge of the wood are the vent channels 140 that allow the air inside the cabinet into the door-frame, although of course, these cuts could be made using other means to form them.

Figure 3:
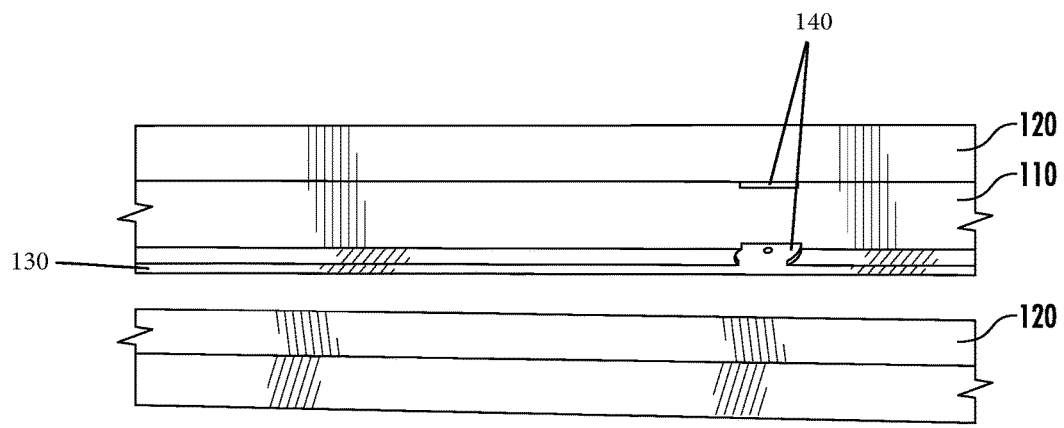
Figure 4:
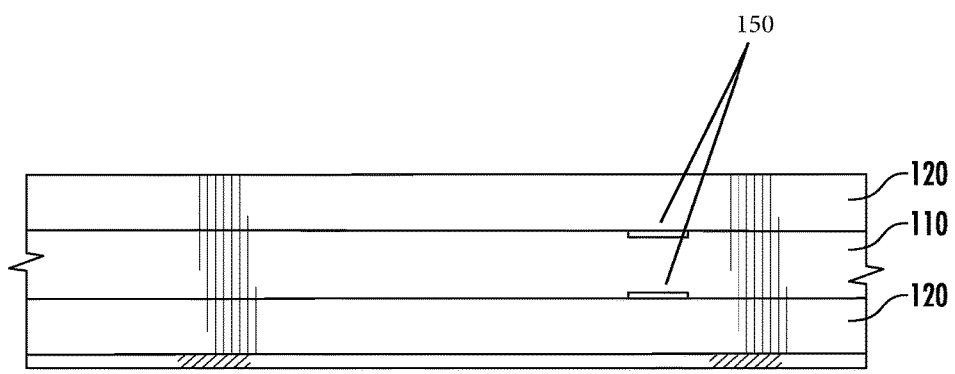
Figure 5:
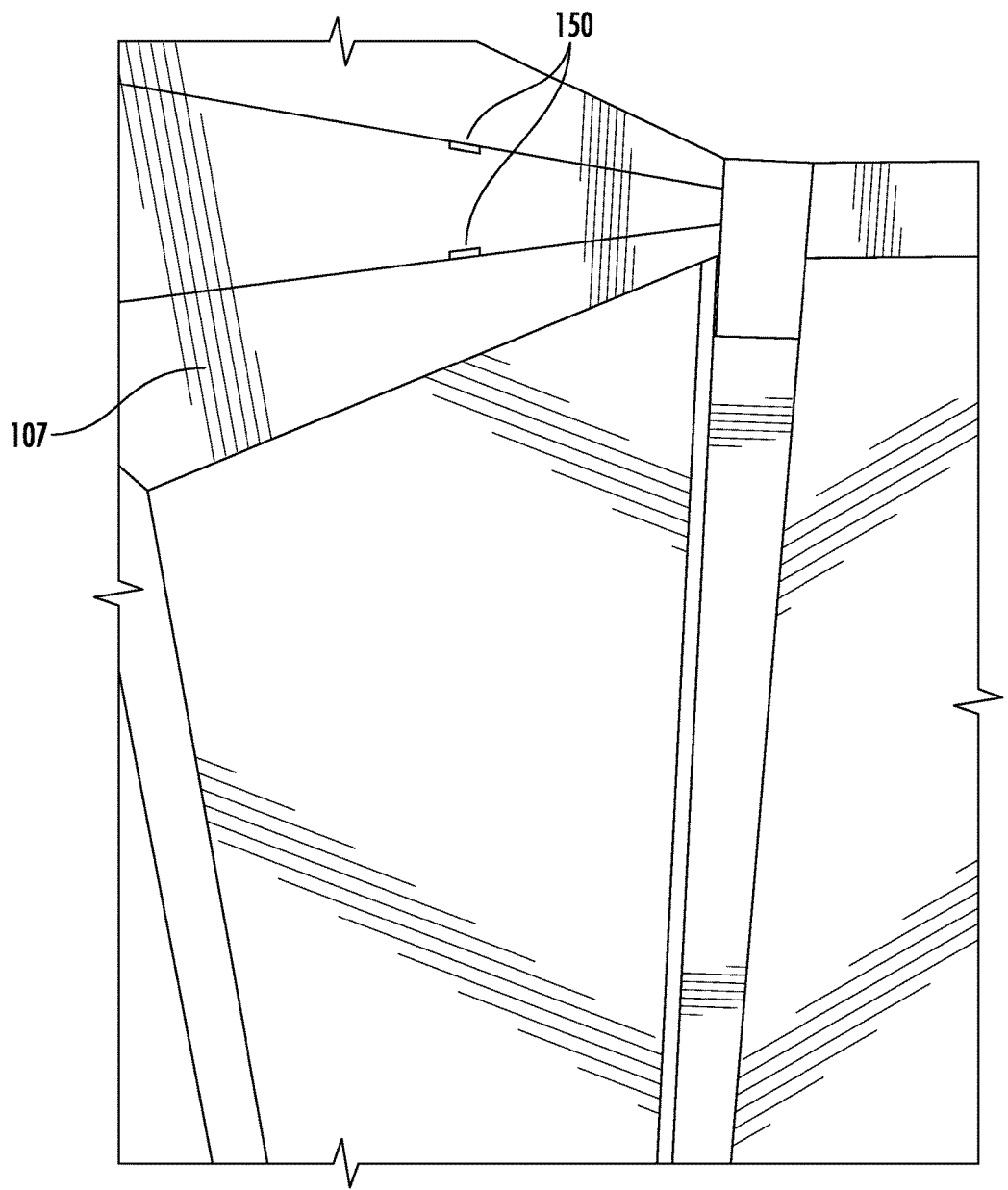

FIGS. 3 and 4 show the inside of the door frame with the vents 150 that extend into the vent channels 140 and channel 130 to allow air passage from within the cabinet along the length of the channel and door frame.

Guitar Shelf Locking Mechanism

Figure 6:
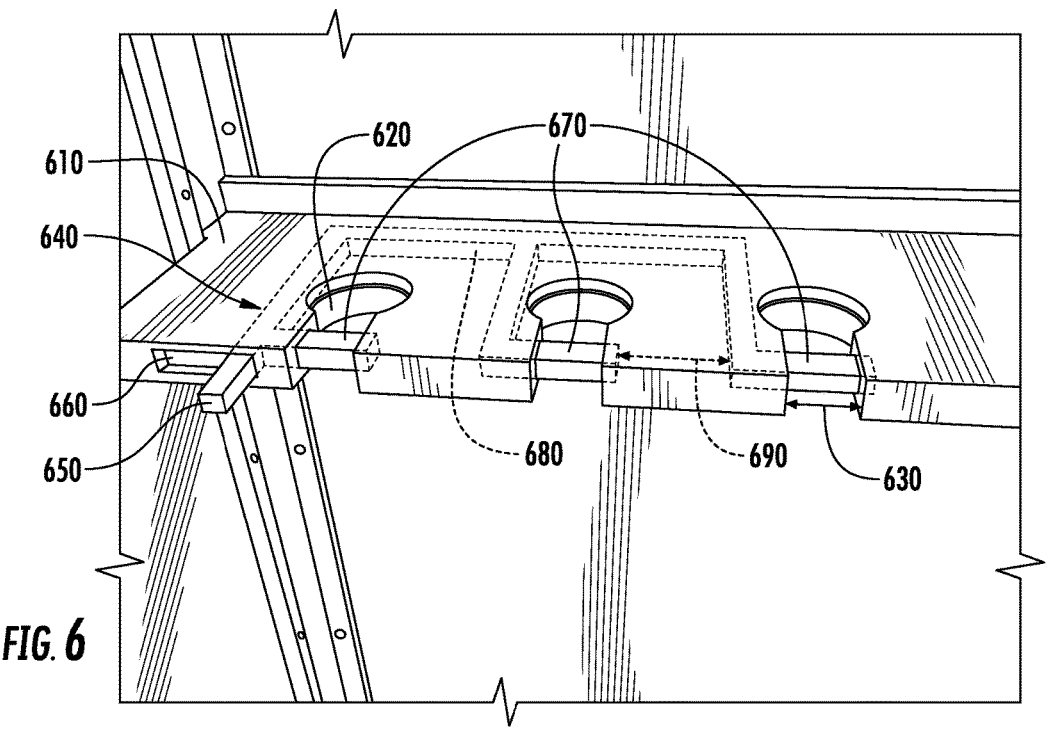
FIG. 6 shows the cabinet shelf and guitar locking mechanism.

FIG. 6 shows a shelf 610 within the guitar cabinet 100 for receiving guitars. When placing a guitar into the cabinet 100, a user slides a guitar neck through an opening 630 into a holding space 620, where the guitar rests with its body below and head above the holding space 620.

This is a traditional holding style, but it does not allow for movement of the cabinet in earthquake zones, high traffic areas, or storm areas, where the cabinet might be subject to shaking. The cabinet 100 addresses this by using a locking mechanism 640 that holds the guitars in place using a control lever 650 that a user slides within a slot 660 to accordingly move a lock bar 670 and open or close the opening 630.

The locking mechanism 640 comprises the control lever 650 and lock bars 670, as well as a lattice 680 that cannot be seen in the cabinet's final form. Open portions 690 of the locking mechanism 640 become exposed when the control lever 650 is slid to the left, which allows for guitar removal. The system may also include a lock to prevent theft.

Dehumidification System

Figure 7:
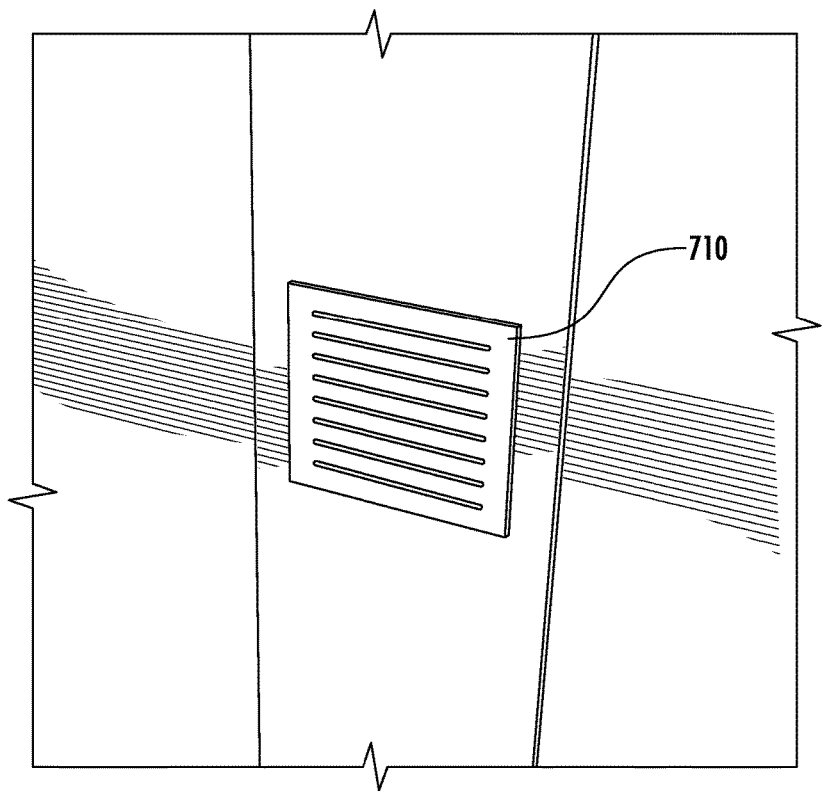
FIG. 7 shows the cabinet dehumidifier.

Ensuring that humidity levels in the cabinet 100 do not drop below certain parameters would normally be taken care of using one of several types of humidifiers. In more humid environments, there is a chance that too much humidity may build up in the cabinet 100; as seen in FIG. 7, this excess humidity may be removed using a dehumidifier vent 710 inside the cabinet, with the vent containing an ionic membrane such as the ROSHAL solid state polymer ionic membrane that, with a low voltage through it, breaks down water into hydrogen and oxygen, thereby leaving no water to dispose of.

While the invention has been described with reference to the embodiments above, a person of ordinary skill in the art would understand that various changes or modifications may be made thereto without departing from the scope of the claims.

The invention claimed is:

1. A cabinet comprising:
    an enclosed storage area for storing moisture sensitive items; and
    wooden doors for accessing the storage area, wherein such doors have one or more internal channels there through, wherein the channels are in communication with the interior of the storage area through vent channels that connect the channel to the storage area and wherein the aforementioned vent channels allow for air inside the storage area to be in contact with an interior of the door.

2. The cabinet of claim 1, further comprising a humidity controller located in the interior of the storage area.

3. The cabinet of claim 2, where the humidity controller includes an ionic membrane that, when subjected to a low-voltage current, breaks down water into hydrogen and oxygen.

4. The cabinet of claim 1, wherein the storage area further includes a shelf with holding spaces of sufficient size to accommodate the necks of guitars.

5. The cabinet of claim 4, where the shelf is equipped with a locking mechanism to hold the guitars in place in the event of movement.

6. The cabinet of claim 5, with the locking mechanism comprising an exposed control lever attached to a lattice of rectangles, each rectangle slideably disposed around each of the holding spaces and concealed within the shelf; each of the aforementioned rectangles being partially open on one side to form a locking bar, and disposed such that if slid in one direction, the locking bars are concealed from view, and if slid in the other direction, the locking bars slide across the entrance to the holding spaces.

7. The cabinet of claim 1, where the cabinet and cabinet doors are made primarily of wood.

8. The cabinet of claim 1, where the door-frame is formed from three flat rectangular pieces of rigid material laminated together.

9. The cabinet of claim 8, with the door frame comprising a middle piece and two outer pieces; the outer pieces being attached to the top and bottom of the middle piece, with the middle piece containing a channel down the length of its top and/or bottom faces, as well as small apertures in either/or the top and bottom faces that form vent channels when the outer pieces are attached to the middle piece, through which outside air may enter the channel.

10. The cabinet of claim 8, where the door frame is made of wood, and where the middle piece of the three-piece door frame is turned to orient the grain of the middle piece in a different direction from the grain of the outer pieces.

11. The cabinet of claim 1 wherein the door is designed with windows that allow the contents of the cabinet to be visible to viewers outside of the cabinet.

* * * * *